Inventor
Harry A. Knox

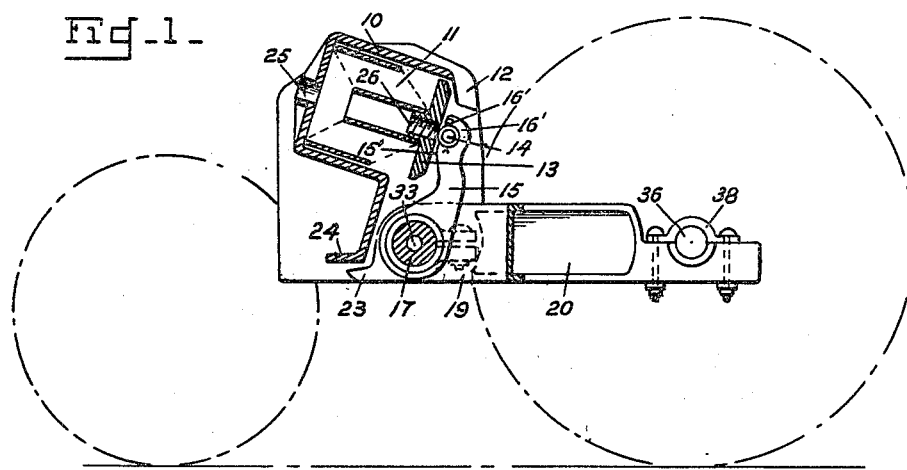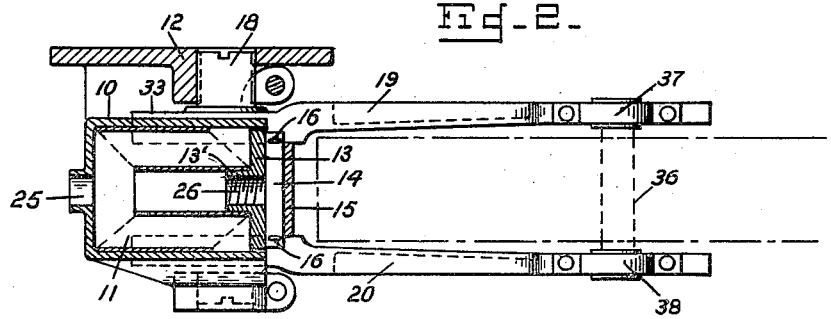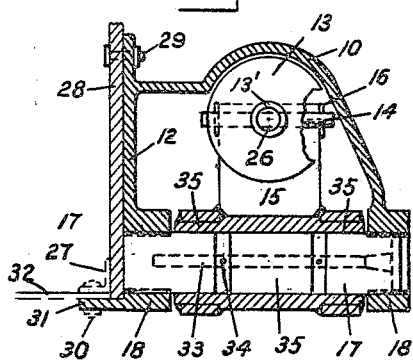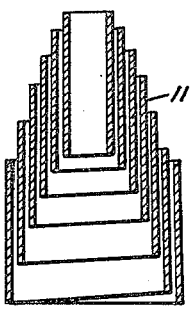

July 13, 1943.  H. A. KNOX  2,323,919
WHEEL SUSPENSION
Filed June 25, 1941   3 Sheets-Sheet 3
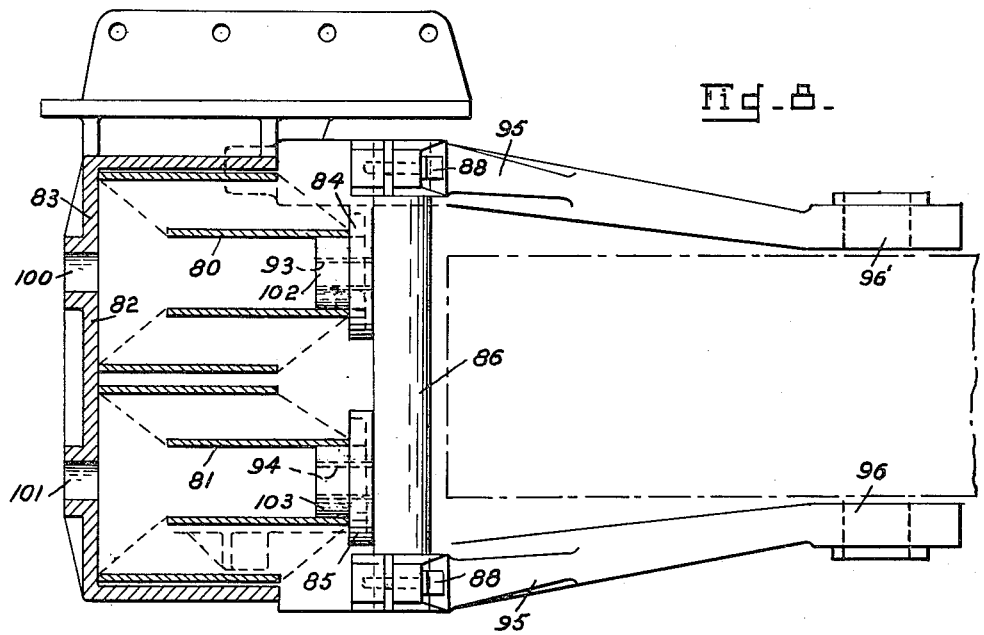
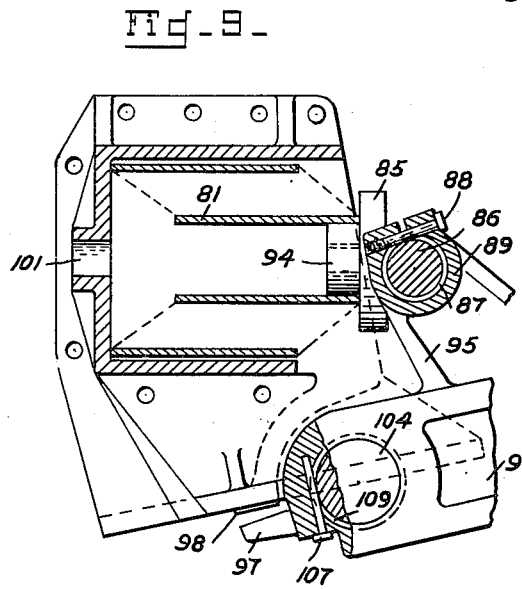
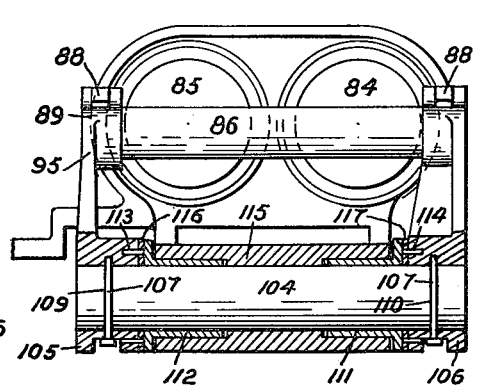
Inventor
Harry A. Knox
By G. J. Kessenich & J. H. Church
Attorneys Patented July 13, 1943

2,323,919

UNITED STATES PATENT OFFICE 2,323,919

WHEEL SUSPENSION

Harry A. Knox, Washington, D. C.

Application June 25, 1941, Serial No. 399,661

6 Claims. (Cl. 267—20)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to apparatus for a track-laying vehicle and more particularly it relates to a spring suspension for a trailing idler on such a vehicle.

An object of my invention is to provide a suspension for the idler wheel of a track-laying vehicle incorporating a volute spring and positive means for mounting the suspension to the body of the vehicle.

An object of my invention is to provide a trailing idler suspension which has practically a linear displacement vs. restoring force characteristic for small displacements of the idler wheel and furnishes more than a proportionate restoring force for large displacements of the idler wheel.

To these and other ends, the invention consists in the construction, arrangement and combination of elements described hereinafter and pointed out in the claims forming a part of this specification.

A practical embodiment of the invention is illustrated in the accompanying drawings, wherein Fig. 1 discloses a side view of the suspension.

Fig. 2 discloses a plan view of the suspension.

Fig. 3 discloses a cross sectional view of the volute spring.

Fig. 4 discloses the mounting bracket mounted on the side and a part of the tank.

Figure 5:
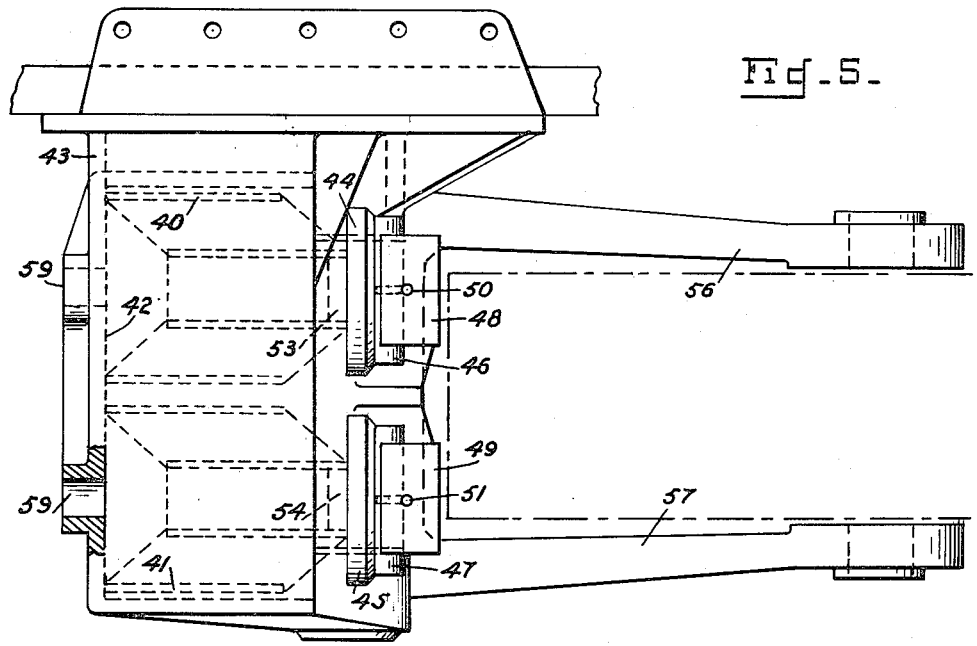
Figure 6:
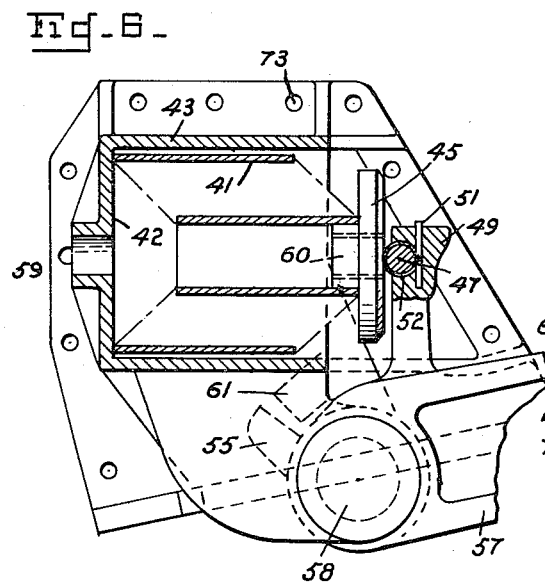
Figure 7:
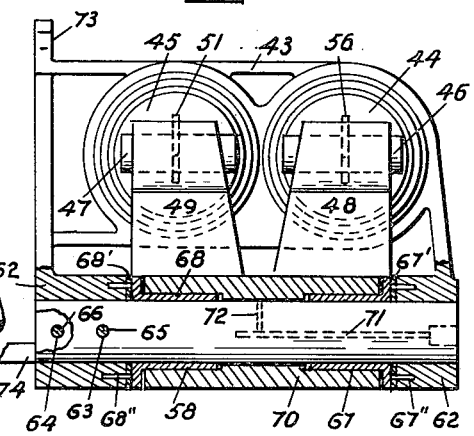

Figs. 5, 6, and 7 disclose views of a modification wherein two volute springs are mounted side by side.

Figs. 8, 9, and 10 disclose views of another modification wherein two volute springs are mounted side by side.

Referring to the drawings wherein like numerals designate like parts, the housing 10 which encases the volute spring 11 is an integral part of the bracket 12. The spring seat 13 having an extension 13' is adapted to abut the smaller diameter of the volute spring and also a hollow pin 14 rotatably mounted on the lever arm 15. The hollow pin 14 extends a distance approximately equal to the outside diameter of the spring seat 13 and is held in place by the bearing-like portions 15' and 16' on the lever 15 and cotter pins 16 inserted through opposite ends of the tube.

The lever 15 is rotatable about the shaft 17 which is held against rotation by clamping action of the hubs 18 on the shaft 17 or by a tongue and groove connection between shaft 17 and hubs 18. The lever 15 is formed integral with the rigid members 19, 20 upon which an idler wheel is to be mounted. A rigid projection 23 on the lever 15 cooperates with an extension 24 on the bracket 12 to limit the clockwise movement of the members 19 and 20. The idler wheel (not shown) is mounted on the members 19, 20. The hole 25, and threaded hole 26 in the housing 10 and spring seat 13 respectively are made of avail in the assembly of this suspension since it is desirable that the volute spring 11 be prestressed so as to cause the members 23 and 24 to be positively engaged when no force is applied to the members 19, 20. When the track (not shown) is assembled on the vehicle, the volute spring 11 is stressed further.

The bracket 12 is mounted on the side of the tank and is clamped to the floor of the tank as indicated in Fig. 4.

In operation, upon movement of the members 19, 20 the lever 15 is rotated, and the volute spring 11 is displaced.

It is highly desirable that the available space near the idler wheels be utilized to the fullest advantage. The particular arrangement of parts in my invention brings about this important desideratum. Because of the minimum space available difficulties arise in designing a suitable suspension which works efficiently and which is readily mounted to the body of the vehicle. My suspension is secured to the body of the vehicle so that most all the work required for installation or removal of the suspension can be entirely done outside the body of the vehicle; the member 12 is fastened to the tank side plate 28 by means of bolts 29, and bolt 30 serves to clamp the projection 31 on member 12 to the plate 32.

The fixed shaft 17 has a hollow central portion 33 which is in communication with laterally disposed holes 34 for the purpose of guiding lubricating material between the cooperating surfaces of shaft 17 and lever bearing 35.

A wheel axle 36 is held in the bearings 37 and 38. It is understood that any other means may be used to mount the wheel axle 36 on the members 19 and 20, and the particular mounting means per se is not the subject of this application.

In the modification shown in Figs. 5, 6, and 7 provisions are made to use two volute springs arranged in side by side relationship to accomplish the same purposes served by the single spring construction but in this instance larger forces may be transmitted.

Two volute springs 40 and 41, similar to the volute spring disclosed in Fig. 3 are held against the inner surface 42 of the housing 43 by spring seats 44 and 45 which are engaged by the cylindrical members 46 and 47 respectively. The members 46 and 47 are partially encased in the arms 48 and 49 respectively and are held rotatably therein by pins 50 and 51. Thus, there is a line contact provided between the spring seats 44, 45 and members 46, 47. The members 46 and 47 each have a circumferentially disposed slot 52 approximately midway between its ends within which the pins 50 and 51 are projected; each cylindrical member is thereby prevented from moving along its axis.

Projections 53 and 54 on spring seats 44 and 45 respectively extend within the hollow inner portions of volute springs 40 and 41 and maintain the springs 40 and 41 in centered relationship.

The arms 48, 49, projections 55, and axle supports 56, 57 are formed integral with one another and are rotatable about shaft 58. A projection 61 in the spring housing 43 is adapted to cooperate with projection 55 so as to limit the movement of the axle supports and thus maintain the volute springs in a prestressed condition when no force is applied to the axle supports 56, 57.

The housing 43 has holes 59 through which auxiliary threaded rods (not shown) may be inserted and screwed into the threaded portions 60 in the spring seats; these means are made of avail in the assembly of the suspension proper and by these means the volute springs may be prestressed and held against movement while the arms 48 and 49 are being mounted on the shaft 58.

The shaft 58 is held fast in the hubs 62 of housing 43 by two pins 63 and 64 which pass through holes 65 in the shaft and through holes 66 in one of the hubs.

Hardened steel bushings 67, 68 are press fitted into the hollow portion 70 which is formed integral with the movable axle supports 56, 57. Hardened washers 67', 68' are mounted on the inside portions of hub 62 by means of circularly disposed pins 67'', 68''. The outer surfaces of the bushings and washers serve as bearing surfaces for the rotatable hollow portion 70. The centrally disposed hole 71 and radially disposed holes 72 in the stationary shaft 58 serve as conduits for lubricating fluid.

Holes 73 in the housing 43 allow fastening members to be passed therethrough and the projection 74 on housing 43 may be made of avail to serve the function of a bracket.

The modified structure shown in Figs. 8, 9 and 10 incorporates two volute springs arranged in side by side relationship.

Two volute springs 80 and 81 similar to the volute spring disclosed in Fig. 3 are held against the inner surface 82 of the housing 83 by spring seats 84 and 85 which are both engaged by the same cylindrical member 86. The cylindrical member 86 has a circumferentially disposed slot 87 on each one of its ends into which the fastening bolts 88 project so that the member 86 is prevented from moving along its axial direction. Split hubs 89 surround the ends of the member 86 and are adapted to be drawn together by bolts 88 so as to prevent rotation of the member 86; thus, a line contact between spring seats 84, 85 and the member 86 is provided. Should the member 86 become worn in operation so that a line contact no longer exists it would be necessary only to loosen bolts 88 and rotate the member 86 a fractional part of a turn.

Projections 93 and 94 on spring seats 84 and 85 respectively extend within the hollow inner portions of volute springs 80 and 81 and maintain the springs 80 and 81 in centered relationship.

The split hubs 89 are held by the rib members 95 which are formed integral with the axle supports 96 and 96'. A projection 97 formed integral with the axle supports is adapted to coact with the projection 98 on the spring housing 83 so as to limit the clockwise movement of the axle supports which is due to the action of the prestressed volute springs 80, 81.

The housing 83 is provided with holes 100 and 101 through which auxiliary threaded rods (not shown) may be inserted and screwed into the threaded portions 102, 103 of spring seat 84, 85. By these means the spring seats 84, 85 may be held out of abutting relationship with the member 86 during the assembling of the suspension and also by these means the volute springs may be prestressed to any required amount. It is noted that in this construction the member 86 serves not only as a contact member but also serves to strengthen the suspension proper.

The axle supports 96 and 96' are mounted stationarily on shaft 104 by means of two pins 107. Pins 107 extend into hollow portions 105, 106 which are formed integral with the axle supports 96 and 96' respectively and project within the circumferentially disposed grooves 109, 110 in shaft 104 so that the shaft 104 is prevented from moving with respect to the axle supports 96, 96'.

Hardened steel bushings 111, 112 are press fitted into the hollow cylindrical portion 115 which is formed integral with the housing 83. Hardened steel washers 116, 117 are fastened to the hollow portions 105, 106 by means of circularly disposed pins 113, 114. The outer surfaces of the bushings and washers serve as bearing surfaces between the stationary casing 83, rotatable shaft 104 and rotatable hollow portions 105, 106.

I claim:

1. A vehicle suspension embodying an arm pivoted about an axis and adapted to hold on its free end a wheel axle, a second arm rigidly connected to said arm and pivoted about the same axis, a spring, a casing for said spring, means for fastening the casing to the vehicle body, a movable seat for said spring having an external bearing surface and a pin mounted on the free end of said second arm coacting with said external bearing surface and means to adjust the initial load on said spring, said means comprising a hole in the front of the casing and a threaded hole in said movable seat for reception of a puller bolt.

2. A vehicle suspension embodying an arm pivoted about an axis and adapted to hold on its free end a wheel axle, a second arm rigidly connected to said arm and pivoted about the same axis, a spring, a casing for said spring, means for fastening the casing to the vehicle body, a movable seat for said spring having an external flat bearing surface, a transverse slot in a side of the free end of said second mentioned arm forming a portion of a cylindrical bearing, and a pin inserted in the partial bearing coacting with said external bearing surface.

3. A vehicle suspension embodying an arm pivoted about an axis and adapted to hold on its free end a wheel axle, a second arm rigidly connected to said arm and pivoted about the same axis, a volute spring, a casing for said spring, means for fastening the casing to the body of the vehicle, a circular movable seat on the smaller end of said spring, said spring seat having an external bearing surface of a diameter substantially equal to the largest diameter of said spring and an extension on the surface adjacent the spring projecting within the center of said volute spring, and a pin mounted on the side of the free end of said second arm coacting with said external bearing surface said pin being of a length substantially equal to the diameter of said seat.

4. In a wheel suspension for a vehicle, a casing, a spring mounted within said casing and one end of said spring abutting an internal surface of said casing, a movable seat for the other end of said spring having an external bearing surface, a pair of hubs formed in the casing, a shaft passing through said hubs, means to maintain the shaft stationary with respect to the hubs, an arm pivoted about said shaft having its free end coacting with said external bearing surface, an extension on said casing, a projection on said arm coacting with said extension for limiting the movement of said arm with respect to said casing and means for pivoting said arm about said shaft.

5. A vehicle suspension embodying an arm pivoted about an axis and adapted to hold on its free end a wheel axis, a second arm rigidly connected to said arm and pivoted about the same axis, a spring, a casing for said spring, means for fastening the casing to the vehicle body, a movable seat for said spring having an external bearing surface, a transverse slot in the free end of said second mentioned arm forming a portion of a cylindrical hole, and a cylindrical member stationarily mounted in said hole coacting with said external bearing surface.

6. A vehicle suspension embodying a pair of pivotable arms adapted to hold on their free ends a wheel axle, an extension on each of said arms, a spring, a casing for said spring, means for fastening the casing to the vehicle body, a movable seat for said spring having an external bearing surface, a cylindrical member abutting said external bearing surface on a line contact, means for rigidly fastening the ends of the cylindrical member to the free ends of said extensions, a hollow portion on the casing, a rotatable shaft passing through said hollow portion, and means for rigidly connecting the ends of said rotatable shaft to the other ends of said first mentioned pivotable arms.

HARRY A. KNOX.